United States Patent
He et al.

(10) Patent No.: US 8,485,685 B2
(45) Date of Patent: Jul. 16, 2013

(54) BACKLIGHT MODULE AND LAMP FASTENER THEREOF

(75) Inventors: Chengming He, Shenzhen (CN); Guofu Tang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 421 days.

(21) Appl. No.: 12/994,171

(22) PCT Filed: Aug. 11, 2010

(86) PCT No.: PCT/CN2010/075895
§ 371 (c)(1),
(2), (4) Date: Nov. 23, 2010

(87) PCT Pub. No.: WO2011/156986
PCT Pub. Date: Dec. 22, 2011

(65) Prior Publication Data
US 2011/0310589 A1 Dec. 22, 2011

(30) Foreign Application Priority Data
Jun. 17, 2010 (CN) .......................... 2010 1 0206849

(51) Int. Cl.
*G02F 1/13357* (2006.01)
(52) U.S. Cl.
USPC .......... 362/225; 362/632; 362/634; 362/97.1; 362/97.4

(58) Field of Classification Search
USPC ................ 362/97.1–97.4, 632–634, 225, 431
See application file for complete search history.

(56) References Cited

U.S. PATENT DOCUMENTS

| | | | | |
|---|---|---|---|---|
| 7,651,258 B2* | 1/2010 | Kim | ............................... | 362/634 |
| 7,682,065 B2* | 3/2010 | Fang | ............................... | 362/634 |
| 7,740,394 B2* | 6/2010 | Cheng et al. | .................. | 362/634 |
| 8,100,548 B2* | 1/2012 | Shen | ........................... | 362/97.1 |
| 8,104,909 B2* | 1/2012 | Shin | .............................. | 362/97.1 |
| 8,215,819 B2* | 7/2012 | Moro et al. | ..................... | 362/634 |
| 8,251,531 B2* | 8/2012 | Satoh | ............................ | 362/97.1 |
| 8,376,605 B2* | 2/2013 | Azuma et al. | ................. | 362/634 |
| 2006/0158905 A1 | 7/2006 | Lai et al. | | |

FOREIGN PATENT DOCUMENTS

| | | |
|---|---|---|
| CN | 1567059 A | 1/2005 |
| CN | 1632662 A | 6/2005 |
| CN | 1696801 A | 11/2005 |
| CN | 101725927 A | 6/2010 |

* cited by examiner

*Primary Examiner* — Anabel Ton
(74) *Attorney, Agent, or Firm* — Ditthavong Mori & Steiner, P.C.

(57) ABSTRACT

The present invention provides a backlight module and a lamp fastener thereof. The lamp fastener has at least two support rods, two movable levers and at least two retaining bars, all of which constructs a movable mechanism for providing at least one closed movable space to stably clamp and position at least one backlight lamp. Thus, it can efficiently prevent the backlight lamp from being separated from the lamp fastener, so that the installation reliability of the backlight lamp and the yield of the impact test thereof can be efficiently enhanced.

15 Claims, 3 Drawing Sheets

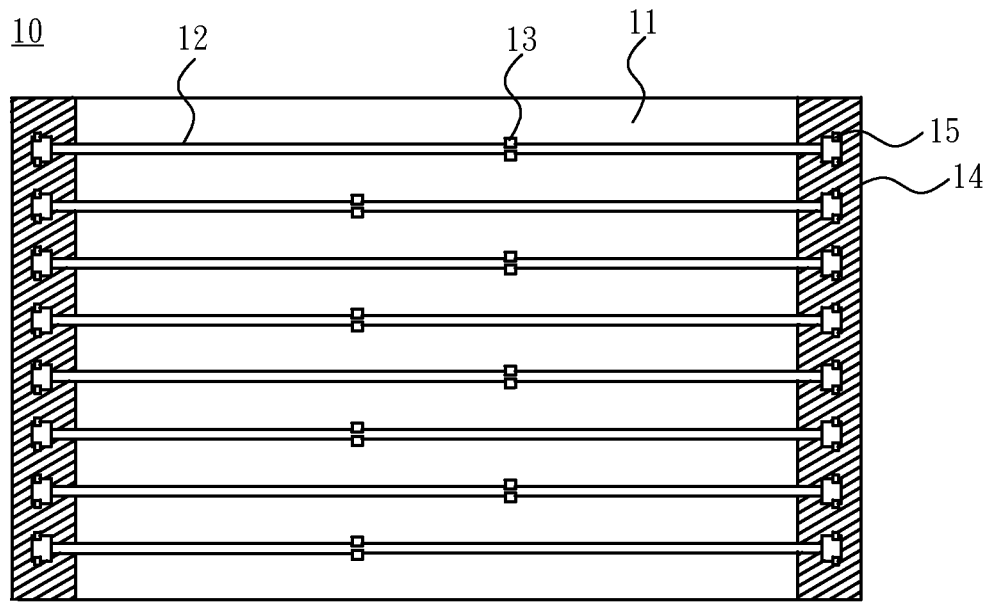
Fig.1
Prior Art
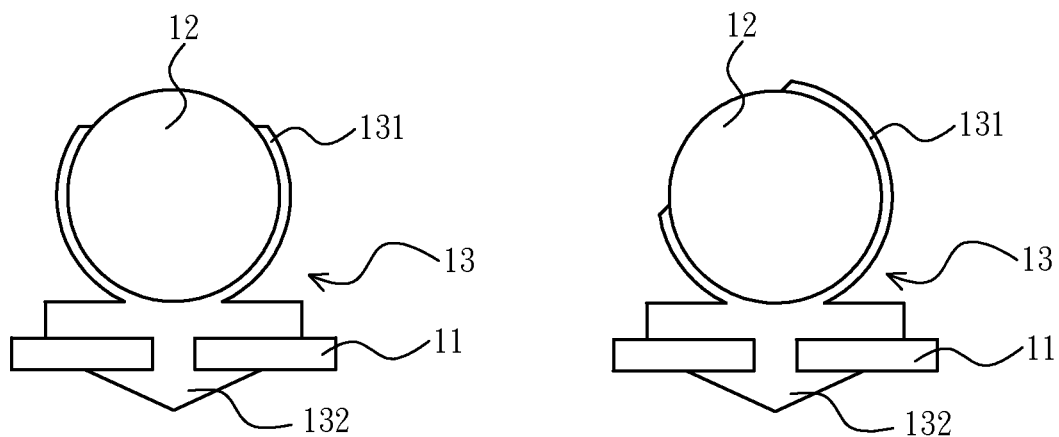
Fig.1A
Prior Art
Fig.1B
Prior Art

BACKLIGHT MODULE AND LAMP FASTENER THEREOF

FIELD OF THE INVENTION

The present invention relates to a backlight module and a lamp fastener thereof, and more particularly to a backlight module having a movable lamp fastener having support rods, movable levers and retaining bars, all of which constructs a movable mechanism for providing at least one closed movable space to stably clamp and position at least one backlight lamp.

BACKGROUND OF THE INVENTION

Nowadays, for the convenience of installation and transportation, many components are generally installed into various modules in advance during the mass production of liquid crystal displays (LCDs). For example, a backlight module is constructed by backlight sources and a diffuser plate, and then a LCD module is constructed by the backlight module, a LCD panel and a front frame.

Referring now to FIGS. 1 and 1A, an assembled top view of a traditional backlight module and a schematic view of a traditional backlight lamp fastener are illustrated, wherein a backlight module 10 substantially comprises a reflector sheet 11, a plurality of backlight lamps 12, a plurality of fasteners 13, two support portions 14 and a plurality of sockets 15. The backlight lamps 12 are mounted on the reflector sheet 11 through the fasteners 13. Meanwhile, two electrode terminals on two ends of the backlight lamps 12 are mounted on the sockets 15 disposed on the support portions 14 on both sides of the fasteners 13, and electrically connected to the sockets 15. As shown in FIG. 1A, each of the fasteners 13 generally comprises two elastic arms 131 and an anchor end 132. The two elastic arms 131 are symmetrically arranged and used to elastically engage and clamp the tubular wall of the backlight lamp 12, while the anchor end 132 is used to insert into and engage with an installation hole (not shown) on the reflector sheet 11.

However, there are some problems existing in the actual use of the fasteners 13, as follows: for installing the backlight lamp 12, an upward opening is formed between the two elastic arms 131, so that the backlight lamp 12 can be inserted into the upward opening. But, when an impact test is executed after installation, the backlight lamp 12 easily jumps upward out of the elastic arms 131 of the fasteners 13 from the upward opening. Thus, the screen brightness of the backlight module 10 may malfunction due to the shift of the backlight lamp 12, resulting in affecting the yield of the impact test of the backlight module 10.

To solve the foregoing problems, referring now to FIG. 1B, a schematic view of another traditional backlight lamp fastener is illustrated, wherein an improved fastener 13 similarly comprises two elastic arms 131 and an anchor end 132. However, the two elastic arms 131 are not symmetrically arranged, while an inclined upward opening is formed between the two elastic arms 131, so that the backlight lamp 12 can be elastically inserted into the upward opening. Thus, when an impact test is executed, it is uneasy for the backlight lamp 12 to jump upward out of the elastic arms 131 of the fasteners 13 from the inclined upward opening. However, in an actual test, there is still some separation risk of the backlight lamp 12 due to the design of the inclined upward opening. Furthermore, because the design of the inclined upward opening of the fastener 13 has a direction different from that of the design of the socket opening of the socket 15 (as shown in FIG. 1), it is difficult to install the backlight lamp 12 onto the fastener 13 and the socket 15, and even to cause the breakage of the backlight lamp 12 due to assembly overexertion.

As a result, it is necessary to provide a backlight module and a lamp fastener thereof to solve the problems existing in the conventional technologies, as described above.

SUMMARY OF THE INVENTION

A primary object of the present invention is to provide a backlight module and a lamp fastener thereof, wherein the lamp fastener has support rods, movable levers and retaining bars, all of which constructs a movable mechanism for providing at least one closed movable space to stably clamp and position at least one backlight lamp. Thus, it can efficiently prevent the backlight lamp from being separated from the lamp fastener, so that the installation reliability of the backlight lamp and the yield of the impact test thereof can be efficiently enhanced.

A secondary object of the present invention is to provide a backlight module and a lamp fastener thereof, wherein the support rods of the lamp fastener has a curved upper abutting end to abut against a diffuser plate of the backlight module, so as to increase the entire installation strength of the backlight module.

A third object of the present invention is to provide a backlight module and a lamp fastener thereof, wherein the movable levers of the lamp fastener has at least one retaining point to block and retain a predetermined angle limit of pivotal rotation of the retaining bars, so as to prevent the retaining bars from directly abutting against the backlight lamp to lower the breakage risk of the backlight lamp.

To achieve the above object, a lamp fastener of a backlight module of a preferred embodiment of the present invention comprises: at least two support rods, each of which has an anchor end; two movable levers, each of which has a pivotal point to pivotally connect each of the movable levers with the corresponding support rods; and at least two retaining bars, each of which has two pivotal ends to pivotally connect the at least two retaining bars with the two movable levers, wherein at least one movable space is defined between the two movable levers and the at least two retaining bars, so that at least one backlight lamp can pass through the at least one movable space and be installed therein.

Furthermore, the present invention provides a backlight module, comprising:

a reflector sheet having at least two sockets and at least two installation holes;

at least one lamp fastener, each of which comprises: at least two support rods, each of which has an anchor end to insert into and engage with the corresponding installation hole of the reflector sheet; two movable levers, each of which has a pivotal point to pivotally connect each of the movable levers with the corresponding support rods; and at least two retaining bars, each of which has two pivotal ends to pivotally connect the at least two retaining bars with the two movable levers, wherein at least one movable space is defined between the two movable levers and the at least two retaining bars; and at least one backlight lamp passing through the at least one movable space of the lamp fastener, wherein two ends of each of the backlight lamp has two electrode terminals mounted on the sockets of the reflector sheet.

In one embodiment of the present invention, each of the support rods has an upper abutting end with a curved shape to abut against a diffuser plate of the backlight module.

In one embodiment of the present invention, further comprising two first pivots, each of which passes through the pivotal point of the two movable levers to pivotally connect the two movable levers with the corresponding support rods.

In one embodiment of the present invention, further comprising at least four second pivots to pivotally connect the pivotal ends of the at least two retaining bars with the two movable levers.

In one embodiment of the present invention, at least one of the two movable levers further comprises at least one retaining point to limit a pivotal angle of the retaining bars.

In one embodiment of the present invention, the support rods, the movable levers, the retaining bars, the first pivots and/or the second pivots are made of transparent material.

In one embodiment of the present invention, the transparent material is a transparent elastic buffering material.

DESCRIPTION OF THE DRAWINGS

FIG. 1 is an assembled top view of a traditional backlight module;

FIG. 1A is a schematic view of a traditional backlight lamp fastener;

FIG. 1B is a schematic view of another traditional backlight lamp fastener;

DETAILED DESCRIPTION OF THE PREFERRED EMBODIMENTS

Figure 2:
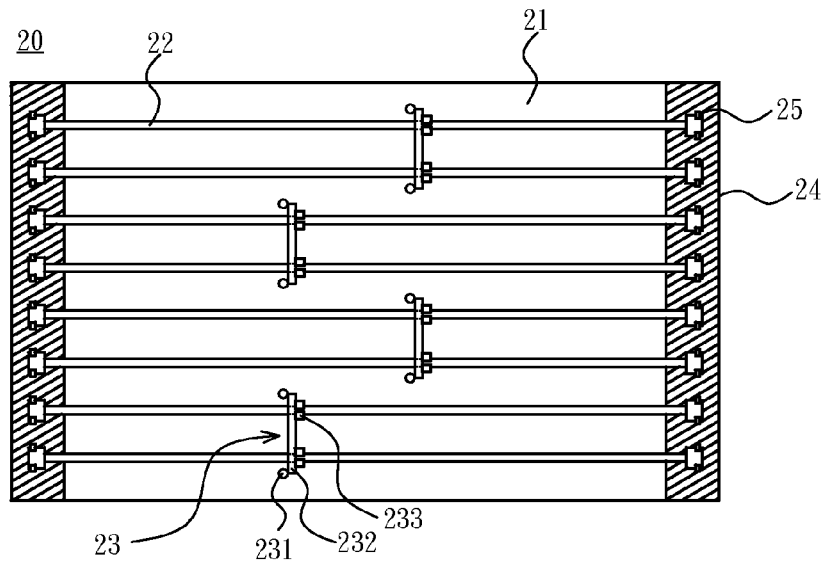
FIG. 2 is an assembled top view of a backlight module according to a preferred embodiment of the present invention.
Figure 3:
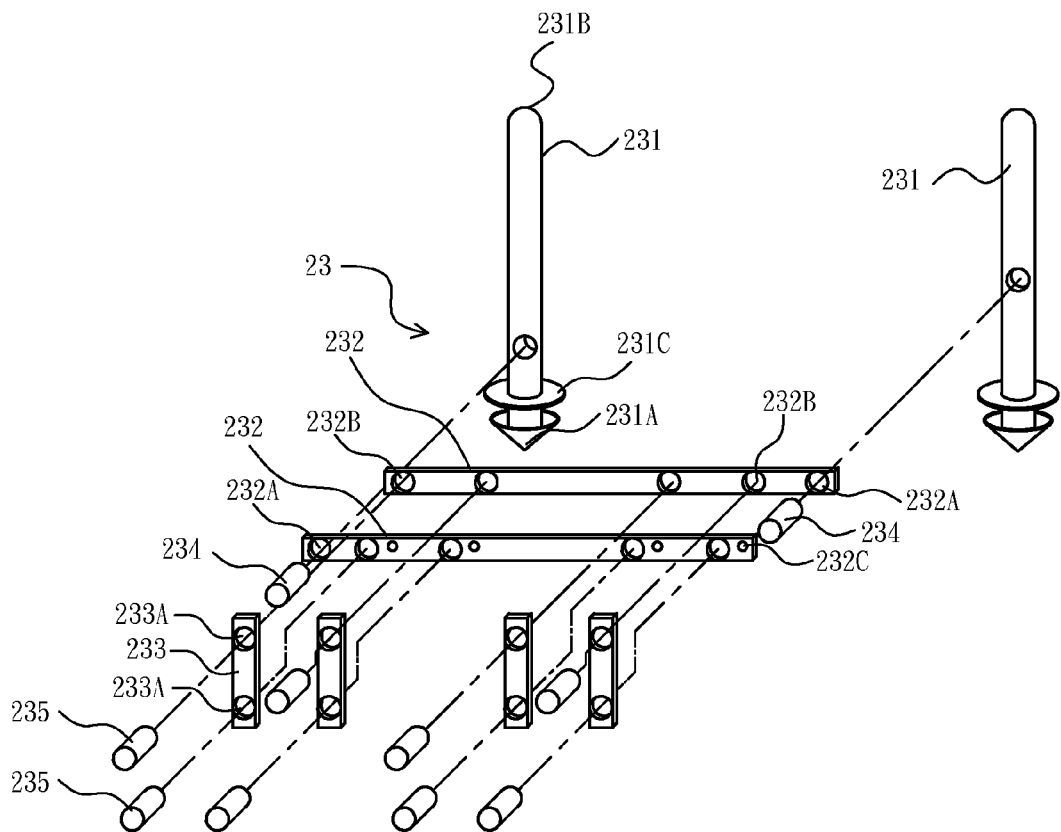
FIG. 3 is an exploded perspective view of a lamp fastener according to the preferred embodiment of the present invention.
Figure 4A:
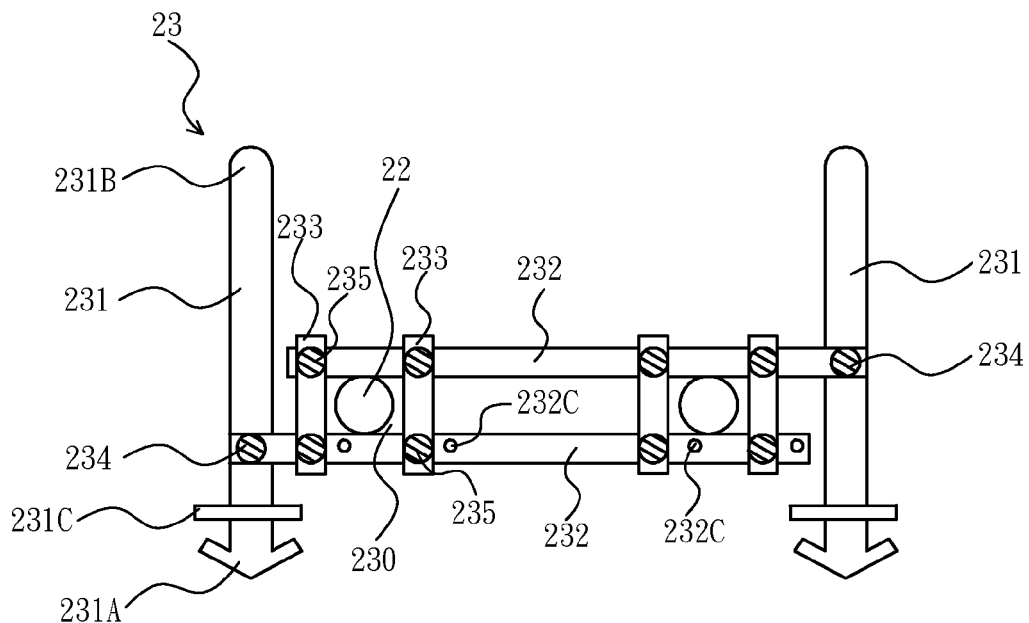
FIG. 4A is an assembled view of the lamp fastener installed with a backlight lamp according to the preferred embodiment of the present invention during initial installation.
Figure 4B:
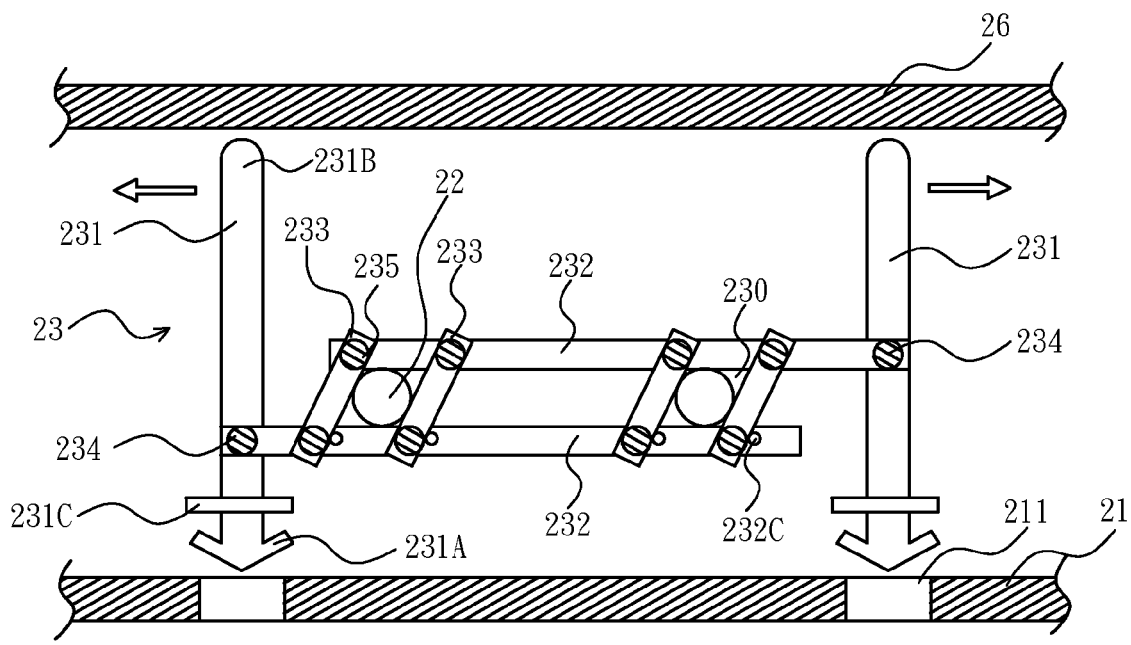
FIG. 4B is another assembled view of the lamp fastener pivotally rotated to clamp and position the backlight lamp according to the preferred embodiment of the present invention.

The structure and the technical means adopted by the present invention to achieve the above and other objects can be best understood by referring to the following detailed description of the preferred embodiments and the accompanying drawings, wherein:

Referring now to FIG. 2, an assembled top view of a backlight module according to a preferred embodiment of the present invention is illustrated, wherein a backlight module 20 of the present invention is mainly applied to the field of liquid crystal display (LCD), and the backlight module 20 comprises a reflector sheet 21, at least one backlight lamp 22, at least one lamp fastener 23, two support portions 24 and at least two sockets 25. The present invention will describe the foregoing elements by a preferred embodiment, as follows:

Referring to FIG. 2, the backlight module 20 in the preferred embodiment of the present invention is generally has a rectangular outer frame (not-shown) to install the reflector sheet 21, the backlight lamp 22 and other optical sheets, such as a diffuser plate 26 as shown in FIG. 4B, a diffuser sheet, a prism sheet and etc. The reflector sheet 21 is used to reflect a backlight beam generated by the backlight lamp 22. The reflector sheet 21 has at least two installation holes 211 formed on suitable positions for combing with the lamp fastener 23. The backlight lamp 22 is supported and mounted on the reflector sheet 21 by the lamp fastener 23. The backlight lamp 22 is preferably a cold cathode fluorescent lamp (CCFL), but not limited thereto. The other optical sheets of the backlight module 20 (such as the diffuser plate 26, a diffuser sheet, a prism sheet and etc.) are disposed above the backlight lamp 22 and the lamp fastener 23. In addition, the two support portions 24 are mounted on both sides of the reflector sheet 21, and each of the support portions 24 is a projected base, on which the sockets 25 are mounted. The sockets 25 can be electrically connected to a positive electrode or a negative electrode of an external power. Each of the sockets 25 basically has two elastic arms for clamping each of electrode terminals of two ends of the backlight lamp 22, but the connection means of the sockets 25 and the electrode terminals is not limited thereto.

Referring to FIGS. 2, 3, 4A and 4B, each of the lamp fastener 23 in the preferred embodiment of the present invention comprises at least two support rods 231, two movable levers 232, at least two retaining bars 233, first pivots 234 and a plurality of second pivots 235. The two support rods 231 are preferably made of transparent material, especially transparent elastic buffering material, such as transparent soft plastic. Each of the two support rods 231 has an anchor end 231A, an upper abutting end 231B and a base 231C. The anchor end 231A is a lower end of the support rod 231, and an outer diameter of the anchor end 231A is greater than a rod diameter of the support rod 231, wherein the anchor end 231A can pass through the installation hole 211 of the reflector sheet 21 by an elastic deformation of the material of the anchor end 231A itself. Further, the base 231C is formed on a position of the support rod 231 adjacent to the anchor end 231A. When the anchor end 231A passes through the installation hole 211 of the reflector sheet 21, the anchor end 231A and the base 231C can elastically abut against both sides of the reflector sheet 21, so that the support rod 231 can be stably and longitudinally engaged and fixed on the installation hole 211 of the reflector sheet 21. Thus, the support rod 231 is substantially vertical to the surface of the reflector sheet 21. Moreover, the upper abutting end 231B is an upper end of the support rod 231, and the upper abutting end 231B is a curved end which is used to suitably abut against a lower surface of the diffuser plate 26 of the backlight module 20 for increasing the entire installation strength of the backlight module 20.

In addition, referring to FIGS. 2, 3, 4A and 4B again, the two movable levers 232 and the at least two retaining bars 233 in the preferred embodiment of the present invention are also preferably made of transparent material, especially transparent elastic buffering material, such as transparent soft plastic. Each of the two movable levers 232 has a pivotal point 232A and at least two pivotal holes 232B, while each of the retaining bars 233 has two pivotal ends 233A. In the embodiment, each of the pivotal point 232A, the pivotal holes 232B and the pivotal ends 233A is an opening for a corresponding pivot to pass through. The pivotal point 232A is formed on a position of each of the movable levers 232 adjacent to the support rod 231, wherein the two first pivots 234 can pass through the pivotal point 232A of the two movable levers 232, respectively, so as to pivotally connect the two movable levers 232 with the corresponding support rod 231 on different sides, wherein one of the movable levers 232 is higher, and the other is lower. Further, the at least two pivotal holes 232B are formed on other suitable rod positions on each of the movable levers 232, while the two pivotal ends 233A are formed adjacent to two ends each of the retaining bars 233. Thus, each of the at least four second pivots 235 can be used to pass through each of the pivotal holes 232B of the movable levers 232 and each of the pivotal ends 233A of the retaining bars 233, so as to pivotally connect the at least two retaining bars 233 with the two movable levers 232. Besides, at least one of the two movable levers 232 (such as the lower movable lever 232) further comprises at least one retaining point 232C to limit a pivotal angle of the retaining bars 233 in relation to the movable levers 232, wherein the retaining point 232C is preferably a projection or a projected post. In the present invention, one movable space 230 is commonly defined between the two movable levers 232 and each pair of the retaining bars 233, so that one of the backlight lamps 22 can pass therethrough and be installed therein. In the embodiment, there are two of the support rods 231, two of the movable levers 232, four of the retaining bars 233, two of the first pivots 234, and eight of the second pivots 235, wherein there are two (or three) of the movable spaces 230, so that two (or three) of the backlight lamps 22 can pass therethrough and be installed therein. However, the number of the foregoing elements can be corresponding adjusted according to the number of the backlight lamps 22 to be installed. For example, if necessary, each of the movable levers 232 can be pivotally connected with two of the corresponding support rods 231 on the same side to provide a better support reliability. In this case, four of the support rods 231 are used, wherein the number of the support rods 231 can be two or more according to a similar operation principle.

Referring to FIGS. 2, 4A and 4B, when the lamp fastener 23 of the present invention is used to install the backlight lamp 22, a plurality of the lamp fastener 23 are firstly pre-installed and provided, wherein each of the lamp fastener 23 can provide at least one movable space 230, such as provide two movable spaces 230. In this case, the movable spaces 230 are in an installation state, wherein the movable space 230 is substantially a rectangular profile and has a greater cross-sectional area. Meanwhile, the height and width of the movable space 230 is substantially greater than the diameter of the backlight lamp 22. Thus, the backlight lamp 22 can smoothly pass through the corresponding movable space 230 of the lamp fastener 23.

After all of the backlight lamps 22 pass through the corresponding movable spaces 230, an operator then pulls one or two of the support rods 231 by hands or an automatic machine, in order to increase a horizontal distance between the two support rods 231. At this time, the support rods 231 simultaneously pull the movable levers 232 to actuate the retaining bars 233 to pivotally rotate a predetermined angle, such as an angle between 30 degree and 60 degree. The stop of the foregoing pivotal rotation is determined because the retaining bars 233 are blocked and retained by the retaining point 232C (or blocked and retained by the tubular wall of the backlight lamps 22), wherein the retaining point 232C can prevent the retaining bars 233 from directly abutting against the backlight lamp 22 to lower the breakage risk of the backlight lamp 22. After pivotally rotating to a predetermined position, all of the movable spaces 230 are simultaneously converted into a retaining state. At this time, the movable space 230 is substantially a parallelogram profile and has a smaller cross-sectional area. Meanwhile, the height (or width) of the movable space 230 is substantially equal to, slightly smaller than or slightly greater than the diameter of the backlight lamp 22. Thus, the backlight lamp 22 is limited to move within the movable space 230.

Finally, the lamp fastener 23 in the retaining state are stably engaged and fixed on the reflector sheet 21 by the anchor end 231A and the installation hole 211. Meanwhile, the electrode terminals of two ends of the backlight lamp 22 are connected to the sockets 25 on the support portions 24. In this way, two of the backlight lamps 22 can be supported and positioned in the embodiment. Other of the backlight lamps 22 can be similarly installed by other of the lamp fasteners 23. After finishing the entire installation of the backlight module 20, the upper abutting ends 231B of the support rods 231 can slightly abut against the lower surface of the diffuser plate 26 of the backlight module 20 for increasing the entire installation strength of the backlight module 20.

As described above, in comparison with the traditional lamp fastener of the backlight module which has an upward opening or an inclined upward opening between the two elastic arms to cause a certain separation risk of the backlight lamp and uneasy installation thereof, the lamp fastener 23 of the present invention as shown in FIGS. 2 to 4B has the support rods 231, the movable levers 232 and the retaining bars 233, all of which constructs a movable mechanism for providing the closed movable space 230 to stably clamp and position the backlight lamp 22. Thus, it can efficiently prevent the backlight lamp 22 from being separated from the lamp fastener 23, so that the installation reliability of the backlight lamp 22 and the yield of the impact test thereof can be efficiently enhanced. Furthermore, the support rods 231 of the lamp fastener 23 of the present invention has the curved upper abutting end 231B to abut against the diffuser plate 26 of the backlight module 20, so as to increase the entire installation strength of the backlight module 20. Moreover, the movable levers 232 of the lamp fastener 23 of the present invention has the retaining point 232C to block and retain a predetermined angle limit of pivotal rotation of the retaining bars 233, so as to prevent the retaining bars 233 from directly abutting against the backlight lamp 22 to lower the breakage risk of the backlight lamp 22.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, characterized in that: the backlight module comprises:
   a reflector sheet having at least two sockets and at least two installation holes;
   at least one lamp fastener, each of which comprises: at least two support rods, each of which has an anchor end to insert into and engage with the corresponding installation hole of the reflector sheet; two movable levers, each of which has a pivotal point to pivotally connect with the corresponding support rods; and at least two retaining bars, each of which has two pivotal ends to pivotally connect the at least two retaining bars with the two movable levers, wherein at least one movable space is defined between the two movable levers and the at least two retaining bars; and
   at least one backlight lamp passing through the at least one movable space of the lamp fastener, wherein two ends of each of the backlight lamp has two electrode terminals mounted on the sockets of the reflector sheet;
   wherein each of the support rods has an upper abutting end with a curved shape to abut against a diffuser plate of the backlight module; and
   wherein at least one of the two movable levers further comprises at least one retaining point to limit a pivotal angle of the retaining bars.

2. A backlight module, characterized in that: the backlight module comprises:
   a reflector sheet having at least two sockets and at least two installation holes;
   at least one lamp fastener, each of which comprises: at least two support rods, each of which has an anchor end to insert into and engage with the corresponding installation hole of the reflector sheet; two movable levers, each of which has a pivotal point to pivotally connect with the corresponding support rods; and at least two retaining bars, each of which has two pivotal ends to pivotally connect the at least two retaining bars with the two movable levers, wherein at least one movable space is defined between the two movable levers and the at least two retaining bars; and at least one backlight lamp passing through the at least one movable space of the lamp fastener, wherein two ends of each of the backlight lamp has two electrode terminals mounted on the sockets of the reflector sheet.

3. The backlight module according to claim 2, characterized in that: each of the support rods has an upper abutting end with a curved shape to abut against a diffuser plate of the backlight module.

4. The backlight module according to claim 2, characterized in that: at least one of the two movable levers further comprises at least one retaining point to limit a pivotal angle of the retaining bars.

5. The backlight module according to claim 2, characterized in that: it further comprises two first pivots, each of which passes through the pivotal point of the two movable levers to pivotally connect the two movable levers with the corresponding support rods.

6. The backlight module according to claim 5, characterized in that: it further comprises at least four second pivots to pivotally connect the pivotal ends of the at least two retaining bars with the two movable levers.

7. The backlight module according to claim 6, characterized in that: the support rods, the movable levers, the retaining bars, the first pivots or the second pivots are made of transparent material.

8. The backlight module according to claim 7, characterized in that: the transparent material is a transparent elastic buffering material.

9. A lamp fastener of a backlight module, characterized in that: the lamp fastener comprises:

at least two support rods, each of which has an anchor end;

two movable levers, each of which has a pivotal point to pivotally connect each of the movable levers with the corresponding support rods; and at least two retaining bars, each of which has two pivotal ends to pivotally connect the at least two retaining bars with the two movable levers, wherein at least one movable space is defined between the two movable levers and the at least two retaining bars, so that at least one backlight lamp can pass through the at least one movable space and be installed therein.

10. The lamp fastener of a backlight module according to claim 9, characterized in that: each of the support rods has an upper abutting end with a curved shape.

11. The lamp fastener of a backlight module according to claim 9, characterized in that: at least one of the two movable levers further comprises at least one retaining point to limit a pivotal angle of the retaining bars.

12. The lamp fastener of a backlight module according to claim 9, characterized in that: it further comprises two first pivots, each of which passes through the pivotal point of the two movable levers to pivotally connect the two movable levers with the corresponding support rods.

13. The lamp fastener of a backlight module according to claim 12, characterized in that: it further comprises at least four second pivots to pivotally connect the pivotal ends of the at least two retaining bars with the two movable levers.

14. The lamp fastener of a backlight module according to claim 13, characterized in that: the support rods, the movable levers, the retaining bars, the first pivots or the second pivots are made of transparent material.

15. The lamp fastener of a backlight module according to claim 14, characterized in that: the transparent material is a transparent elastic buffering material.

* * * * *